US008614823B2

(12) United States Patent  (10) Patent No.: US 8,614,823 B2
Hayakawa  (45) Date of Patent: Dec. 24, 2013

(54) TECHNIQUE FOR PROCESSING PRINT DATA IN PARALLEL USING PLURAL RASTER IMAGE PROCESSORS IN ORDER TO INCREASE PRINTING SPEED

(75) Inventor: Michio Hayakawa, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 151 days.

(21) Appl. No.: 13/224,846

(22) Filed: Sep. 2, 2011

(65) Prior Publication Data

US 2012/0243047 A1  Sep. 27, 2012

(30) Foreign Application Priority Data

Mar. 24, 2011  (JP) .................. 2011-066656

(51) Int. Cl.
*G06K 15/00* (2006.01)
(52) U.S. Cl.
USPC ....................................... 358/1.16
(58) Field of Classification Search
USPC ................................. 358/1.15, 1.16
See application file for complete search history.

(56) References Cited

U.S. PATENT DOCUMENTS

| | | | |
|---|---|---|---|
| 5,157,765 A | 10/1992 | Birk et al. | |
| 5,548,390 A | 8/1996 | Sugisaki et al. | |
| 7,072,052 B1 | 7/2006 | Tanahashi et al. | |
| 2004/0070783 A1 | 4/2004 | Yasuda | |
| 2007/0064276 A1 | 3/2007 | Park et al. | |
| 2008/0084572 A1 | 4/2008 | Capper et al. | |
| 2008/0259392 A1* | 10/2008 | Tokumoto | 358/1.15 |
| 2009/0153892 A1 | 6/2009 | Torii | |

FOREIGN PATENT DOCUMENTS

| | | |
|---|---|---|
| EP | 0 432 896 A2 | 6/1991 |
| EP | 1 167 022 A1 | 1/2002 |
| JP | U-60-42791 | 3/1985 |
| JP | A-7-237336 | 9/1995 |
| JP | A-7-251543 | 10/1995 |
| JP | A-11-170656 | 6/1999 |
| JP | A-2001-134389 | 5/2001 |
| JP | B2-3211417 | 7/2001 |
| JP | A-2003-125188 | 4/2003 |
| JP | B2-3488157 | 10/2003 |
| JP | A-2006-297672 | 11/2006 |
| JP | A-2008-117379 | 5/2008 |
| JP | A-2011-25422 | 2/2011 |

OTHER PUBLICATIONS

Nov. 23, 2012 Extended European Search Report issued in European Patent Application No. 10155079.6.

(Continued)

*Primary Examiner* — Eric A Rust
(74) *Attorney, Agent, or Firm* — Oliff & Berridge, PLC

(57) ABSTRACT

An image processing system includes plural intermediate data generators, a first memory, and plural drawing data generators. Each of the plural intermediate data generators interprets an assigned data portion of document data, written in a page description language, to generate intermediate data. The first memory stores the intermediate data generated by each of the plural intermediate data generators. Each of the plural drawing data generators reads out the intermediate data from the first memory and generates drawing data in accordance with the read out intermediate data. The drawing data includes information about each pixel included in a printed image. Once an amount of intermediate data stored in the first memory exceeds a first threshold that is set in advance, the plural drawing data generators start reading out the intermediate data from the first memory.

5 Claims, 14 Drawing Sheets

(56) References Cited

OTHER PUBLICATIONS

U.S. Appl. No. 13/198,132 in the name of Hayakawa filed on Aug. 11, 2011.
U.S. Appl. No. 12/714,018 in the name of Hayakawa filed on Feb. 26, 2010.
Mar. 4, 2013 Office Action issued in U.S. Appl. No. 12/714,018.
Aug. 1, 2013 Office Action issued in U.S. Appl. No. 12/714,018.
Office Action in U.S. Appl. No. 13/198,132 mailed Oct. 4, 2013.

* cited by examiner

FIG. 5

| – Yellow – | – Magenta – | – Cyan – | – Black – |
|---|---|---|---|
| 1: line, y2, x3, x9, 0 | 1: line, y2, x3, x9, 255 | 1: line, y2, x3, x9, 255 | 1: line, y2, x3, x9, 0 |
| 2: duplicate | 2: duplicate | 2: duplicate | 2: duplicate |
| 3: window, x2, x10 | 3: window, x2, x10 | 3: window, x2, x10 | 3: window, x2, x10 |
| 4: duplicate | 4: duplicate | 4: duplicate | 4: duplicate |
| 5: window, x1, x11 | 5: window, x1, x11 | 5: window, x1, x11 | 5: window, x1, x11 |
| 6: duplicate | 6: duplicate | 6: duplicate | 6: duplicate |
| 7: line, y3, x12, x17, 0 | 7: line, y3, x12, x17, 0 | 7: line, y3, x12, x17, 0 | 7: line, y3, x12, x17, 255 |
| 8: window, x14, x15 | 8: window, x14, x15 | 8: window, x14, x15 | 8: window, x14, x15 |
| 9: duplicate | 9: duplicate | 9: duplicate | 9: duplicate |
| 10: duplicate | 10: duplicate | 10: duplicate | 10: duplicate |
| 11: duplicate | 11: duplicate | 11: duplicate | 11: duplicate |
| … | … | … | … |

Obj1: rows 1–6
Obj2: rows 7–11

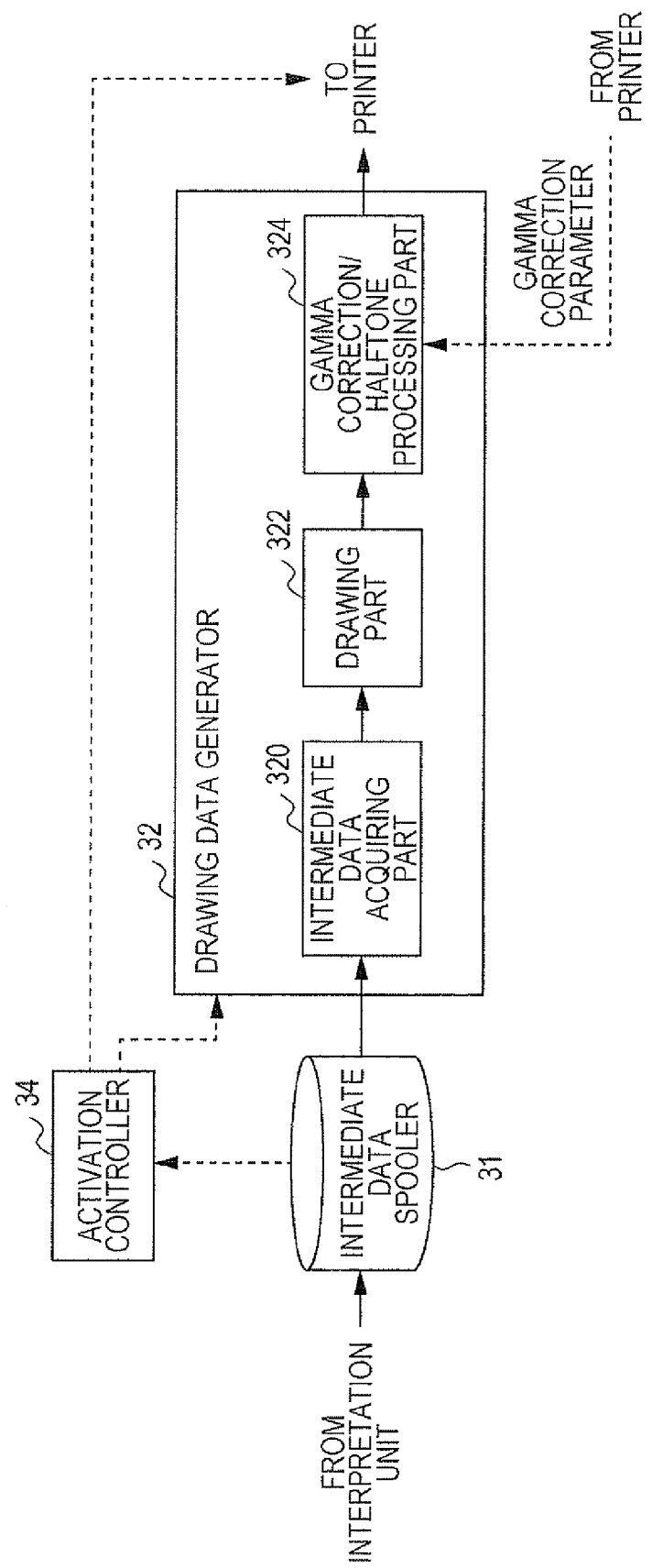

TECHNIQUE FOR PROCESSING PRINT DATA IN PARALLEL USING PLURAL RASTER IMAGE PROCESSORS IN ORDER TO INCREASE PRINTING SPEED

CROSS-REFERENCE TO RELATED APPLICATIONS

This application is based on and claims priority under 35 USC 119 from Japanese Patent Application No. 2011-066656 filed Mar. 24, 2011.

BACKGROUND (i) Technical Field

The present invention relates to an image processing system, an image processing method, and a computer readable medium storing a program.

(ii) Related Art

Techniques for processing print data in parallel using plural raster image processors (RIPS) in order to increase the printing speed are available. A RIP is hardware that renders data written in a page description language (PDL), such as PostScript (registered trademark), into printable or displayable raster data. For example, when a large amount of print data is printed at high speed by a continuous paper printer (or a continuous feed printer) that performs printing on a continuous sheet, processing for rendering print data into raster data restricts the printing speed. For this reason, improving the speed of the processing for rendering print data into raster data is attempted by processing the print data in parallel using plural RIPs.

SUMMARY

According to an aspect of the invention, there is provided an image processing system including plural intermediate data generators, a first memory, and plural drawing data generators. Each of the plural intermediate data generators interprets an assigned data portion of document data, written in a page description language, to generate intermediate data. The first memory stores the intermediate data generated by each of the plural intermediate data generators. Each of the plural drawing data generators reads out the intermediate data from the first memory and generates drawing data in accordance with the read out intermediate data. The drawing data includes information about each pixel included in a printed image. Once an amount of intermediate data stored in the first memory exceeds a first threshold that is set in advance, the plural drawing data generators start reading out the intermediate data from the first memory.

BRIEF DESCRIPTION OF THE DRAWINGS

Exemplary embodiment(s) of the present invention will be described in detail based on the following figures, wherein:

FIG. 5 is a diagram illustrating an example of content of intermediate data;

FIG. 6 is a block diagram illustrating an example of an internal configuration of a drawing data generator;

DETAILED DESCRIPTION

System Hardware Configuration

Figure 1:
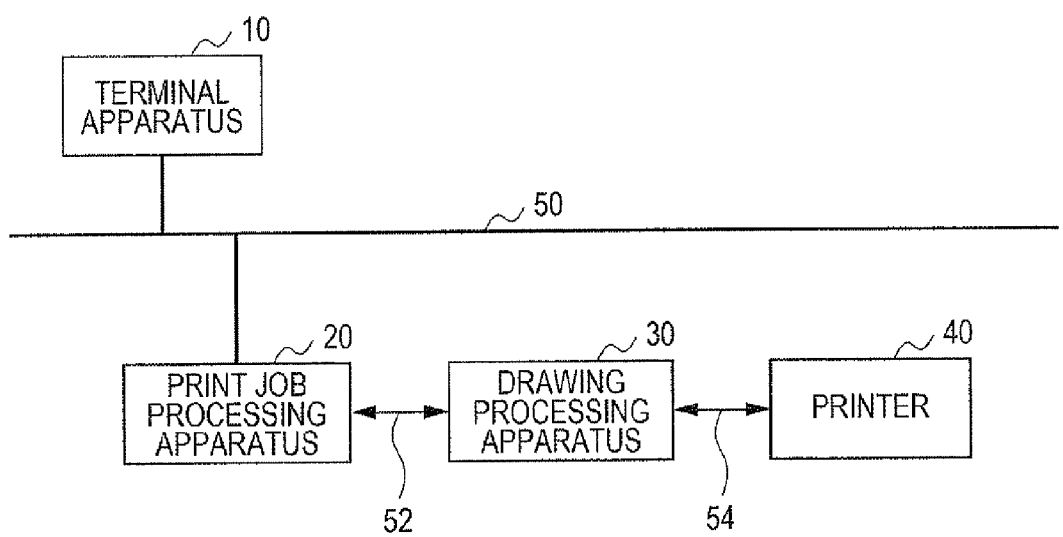
FIG. 1 is a block diagram illustrating an example of a configuration of an image processing system.

FIG. 1 is a block diagram illustrating an example of a configuration of an image processing system. It is assumed that each of image processing systems according to various exemplary embodiments of the present invention to be described below has the configuration illustrated in FIG. 1. The image processing system illustrated in FIG. 1 includes a terminal apparatus 10, a print job processing apparatus 20, a drawing processing apparatus 30, and a printer 40. The terminal apparatus 10 is connected to the print job processing apparatus 20 via a communication line 50. In accordance with a user instruction, the terminal apparatus 10 sends a print job including a document print instruction to the print job processing apparatus 20. The print job processing apparatus 20 is connected to the drawing processing apparatus 30 via a communication line 52. The drawing processing apparatus 30 is connected to the printer 40 via a communication line 54.

The communication lines 50, 52, and 54 may be a network, such as a local area network (LAN). The communication lines 50, 52, and 54 may be of the same kind or of different kinds. For example, a LAN is used as the communication line 50 between the terminal apparatus 10 and the print job processing apparatus 20. Dedicated communication lines other than a LAN may be used as the communication line 52 between the print job processing apparatus 20 and the drawing processing apparatus 30 and as the communication line 54 between the drawing processing apparatus 30 and the printer 40.

In the image processing system illustrated in FIG. 1, the print job processing apparatus 20 processes a print job sent from the terminal apparatus 10 and supplies data resulting from the processing to the drawing processing apparatus 30. In accordance with drawing data generated by the drawing processing apparatus 30, the printer 40 performs printing.

Figure 2:
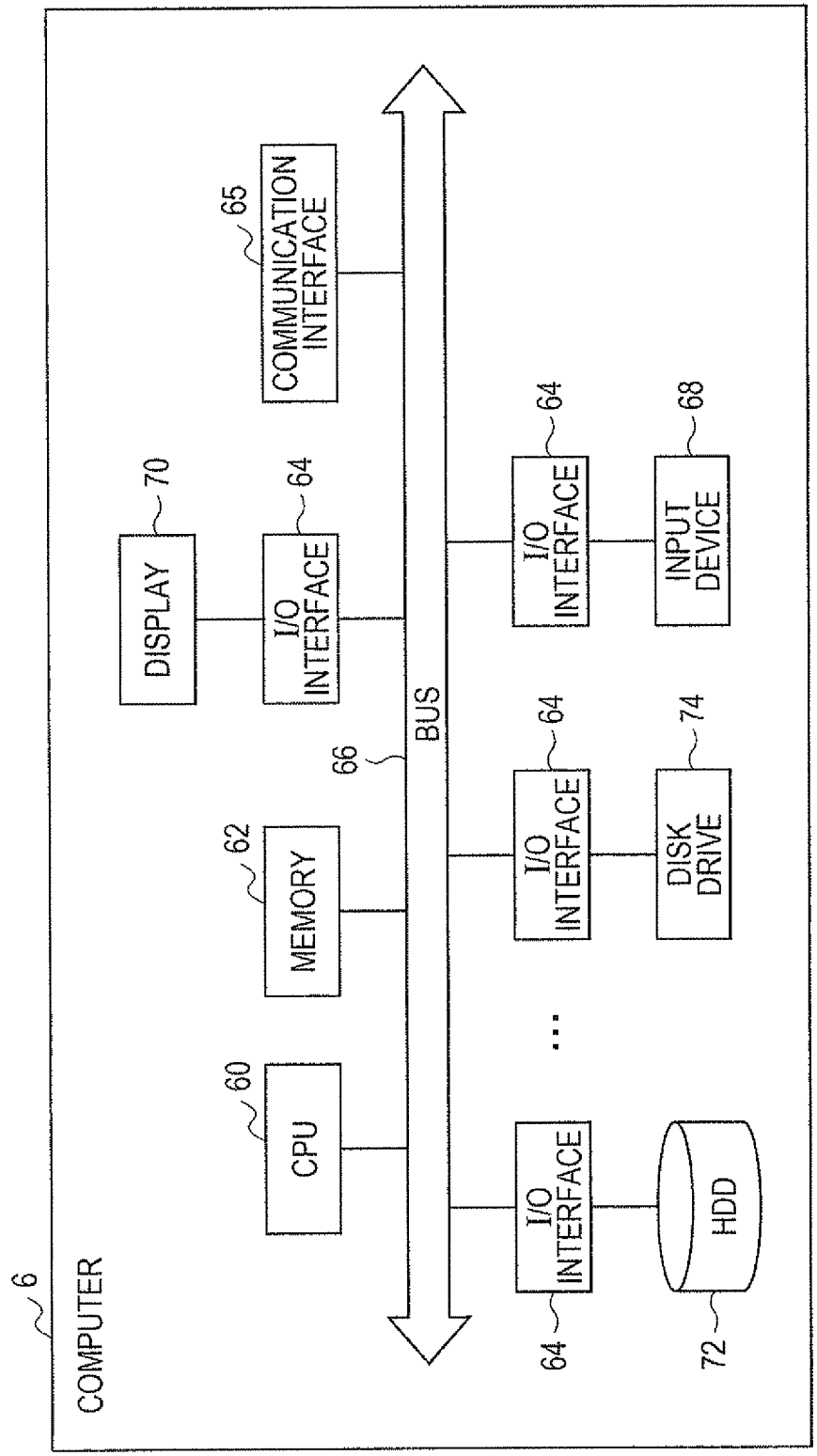
FIG. 2 is a block diagram illustrating an example of a hardware configuration of a computer.

The terminal apparatus 10, the print job processing apparatus 20, and the drawing processing apparatus 30 illustrated in FIG. 1 may be realized by a computer having a hardware configuration illustrated in FIG. 2, for example. A computer 6 illustrated in FIG. 2 has, as hardware, a circuitry including a central processing unit (CPU) 60, a memory (primary storage) 62, various input/output (I/O) interfaces 64, a communication interface 65, and so forth that are connected to each other via a bus 66. The computer 6 exchanges data with other apparatuses via the communication interface 65. Additionally, an input device 68, such as a keyboard or a mouse, and a display 70, such as a cathode ray tube (CRT) or a liquid crystal display (LCD), are connected to the bus 66 via the I/O interfaces 64, for example. A hard disk drive (HDD) 72 and a disk drive 74 for reading nonvolatile portable recording media based on various standards, such as a compact disc (CD), a digital versatile disc (DVD), and a flash memory, are also connected the bus 66 via the I/O interfaces 64. The HDD 72 and the disk drive 74 function as external storage devices for the memory 62. A program including processing content according to each exemplary embodiment to be described later is stored in a fixed storage device, such as the HDD 72, via recording media, such as a CD and a DVD, or via a network and is installed in the computer 6. The program stored in the fixed storage device is loaded to the memory 62 and executed by the CPU 60, whereby the processing according to each exemplary embodiment to be described later is realized.

In each exemplary embodiment to be described later, some functions of the drawing processing apparatus 30 may be realized by hardware processing instead of software processing that results from execution of a program. The hardware processing is performed, for example, using a processor, called a dynamic reconfigurable processor (DRP), that can dynamically reconfigure a circuitry during execution of processing. Alternatively, the hardware processing may be performed using a circuit, such as an application specific integrated circuit (ASIC). For example, hardware components, such as a DRP and an ASIC, that execute some functions of the drawing processing apparatus 30 are configured in advance. Such hardware components are connected to the bus 66 of the computer 6 illustrated in FIG. 2. In this way, the drawing processing apparatus 30 may be realized. Meanwhile, functions of the drawing processing apparatus 30 that can be configured as the hardware processing will be described later.

Specific examples of hardware that realizes the print job processing apparatus 20 and the drawing processing apparatus 30 may include a blade server. The blade server includes plural information processing apparatuses, each functioning as a server, in one housing. The blade server is a server device that includes plural boards (blades), on each of which the configuration such as the computer 6 illustrated in FIG. 2 is mounted, in one housing. For example, it may be configured that one blade included in the blade server functions as the print job processing apparatus 20 and another blade thereof functions as the drawing processing apparatus 30. Alternatively, for example, each of the print job processing apparatus 20 and the drawing processing apparatus 30 may be realized by plural blades included in the blade server.

The printer 40, e.g., a continuous paper printer, performs printing on media, such as paper. Each exemplary embodiment will be described below for an example case in which a continuous paper printer is used as the printer 40. Meanwhile, it is assumed that the printer 40 performs printing using an electrophotographic print engine, an inkjet print engine, or a print engine of another type.

First Exemplary Embodiment

Figure 3:
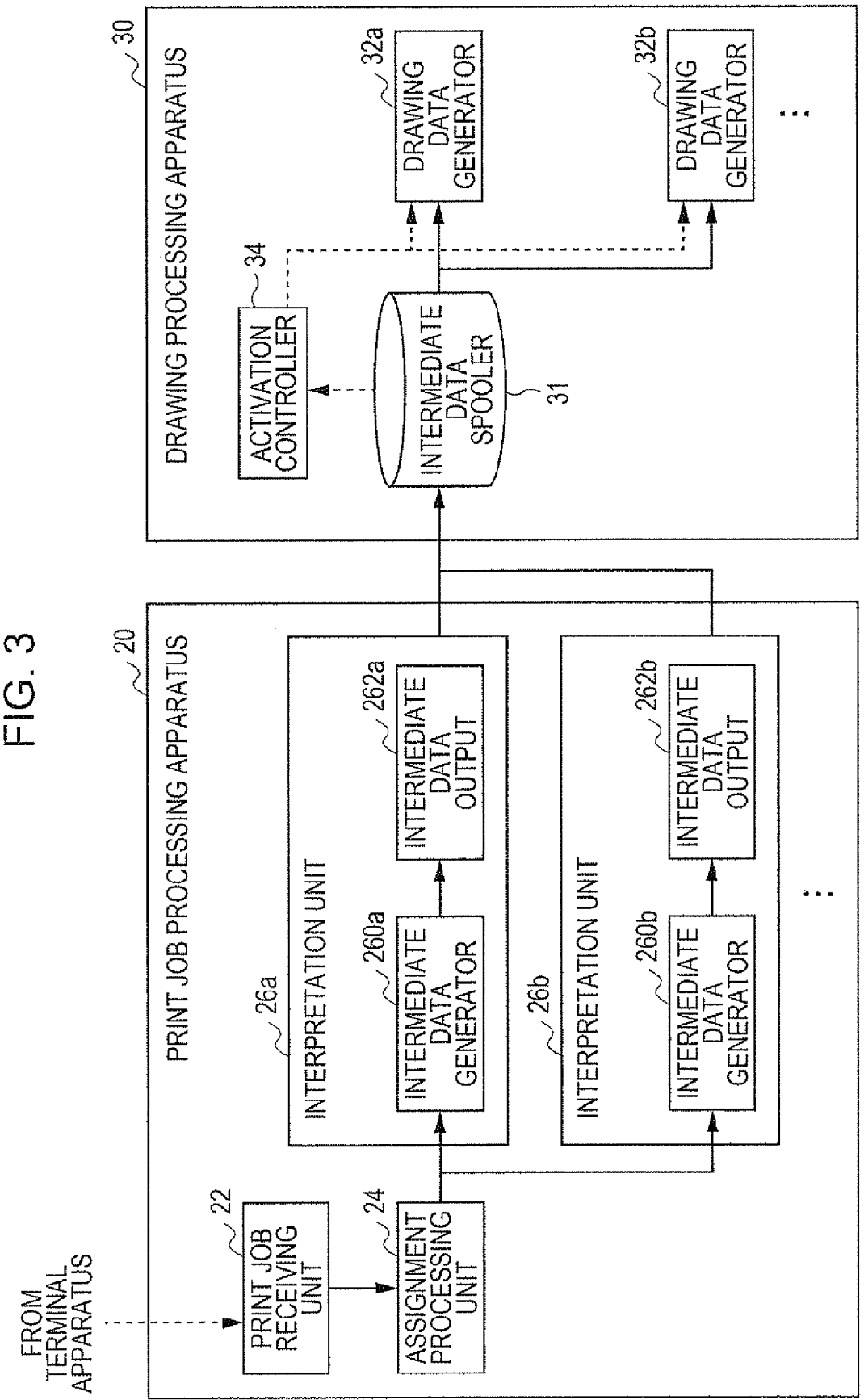
FIG. 3 is a block diagram illustrating an example of functional configurations of a print job processing apparatus and a drawing processing apparatus.

FIG. 3 illustrates an example of functional configurations of the print job processing apparatus 20 and the drawing processing apparatus 30 according to a first exemplary embodiment of the present invention. The print job processing apparatus 20 includes a print job receiving unit 22, an assignment processing unit 24, and plural interpretation units 26a, 26b, and so forth (which may be collectively referred to as "interpretation units 26"). The drawing processing apparatus 30 includes an intermediate data spooler 31, plural drawing data generators 32a, 32b, and so forth (which may be collectively referred to as "drawing data generators 32"), and an activation controller 34.

The print job receiving unit 22 of the print job processing apparatus 20 receives a print job from the terminal apparatus 10. In this exemplary embodiment, a print job includes a document print instruction and data of a document to be printed that is written in a page description language. A page description language is a computer programming language for causing an information processing apparatus to execute display processing, printing processing, and so forth. The data written in the page description language includes position information, format information, color information of objects, such as a text and a figure, that constitute the document to be printed. In the description below, data of a document to be printed that is written in a page description language is referred to as "PDL". The print job receiving unit 22 supplies PDL included in the received print job to the assignment processing unit 24.

The assignment processing unit 24 decides which one of the interpretation units 26a, 26b, and so forth is to process which one of pages included in the PDL acquired from the print job receiving unit 22. The assignment processing unit 24 assigns each page to one of the interpretation units 26a, 26b, and so forth on the basis of operation states of the interpretation units 26a, 26b, and so forth. For example, pages are assigned, sequentially from the first page of the PDL, preferentially to the interpretation unit 26 that is not executing a process or the interpretation unit 26 that is executing a process, processing load of which is lower than other processes executed by the other interpretation units 26. The assignment processing unit 24 notifies each of the interpretation units 26a, 26b, and so forth of the assigned page and also supplies the PDL acquired from the print job receiving unit 22 to each of the interpretation units 26a, 26b, and so forth. In this exemplary embodiment, it is assumed that the assignment processing unit 24 supplies the entire PDL to each of the interpretation units 26a, 26b, and so forth instead of each assigned page of the PDL. In a modification, the assignment processing unit 24 assigns each page of the PDL to one of the interpretation units 26a, 26b, and so forth. Based on this page assignment, the assignment processing unit 24 may supply the divided PDL for each page to the corresponding one of the interpretation units 26a, 26b, and so forth.

The interpretation unit 26 interprets the PDL acquired from the assignment processing unit 24 to generate intermediate data for the assigned page notified by the assignment processing unit 24. The interpretation unit 26 also outputs the generated intermediate data. The intermediate data includes commands representing a procedure for generating drawing data. The interpretation unit 26 includes an intermediate data generator 260 (260a, 260b, and so forth) and an intermediate data output 262 (262a, 262b, and so forth).

The intermediate data generator 260 interprets the PDL to generate the intermediate data of a page assigned thereto. The intermediate data is a data that is to be converted into data ultimately output to the printer 40. Examples of the intermediate data include a display list. The intermediate data generator 260 according to this exemplary embodiment generates intermediate data for each of the primary colors used in printing performed by the printer 40. An example case of using four primary colors, i.e., yellow (Y), magenta (M), cyan (C), and black (K), will be described below. Intermediate data includes, for each object constituting a document to be printed, drawing commands representing a procedure for drawing the object in a printed image of the document. As a language for writing the drawing commands, a language that expresses the procedure in a more detailed manner than the page description language is used. For example, when information representing a position, a shape, and a size of an object in a printed image is defined in the page description language, drawing commands of the object in intermediate data may describe a procedure for drawing the object in units of scanning lines of the printed image. In accordance with the intermediate data, the drawing processing apparatus 30, which will be described later, generates drawing data to be output to the printer 40.

Figure 4:
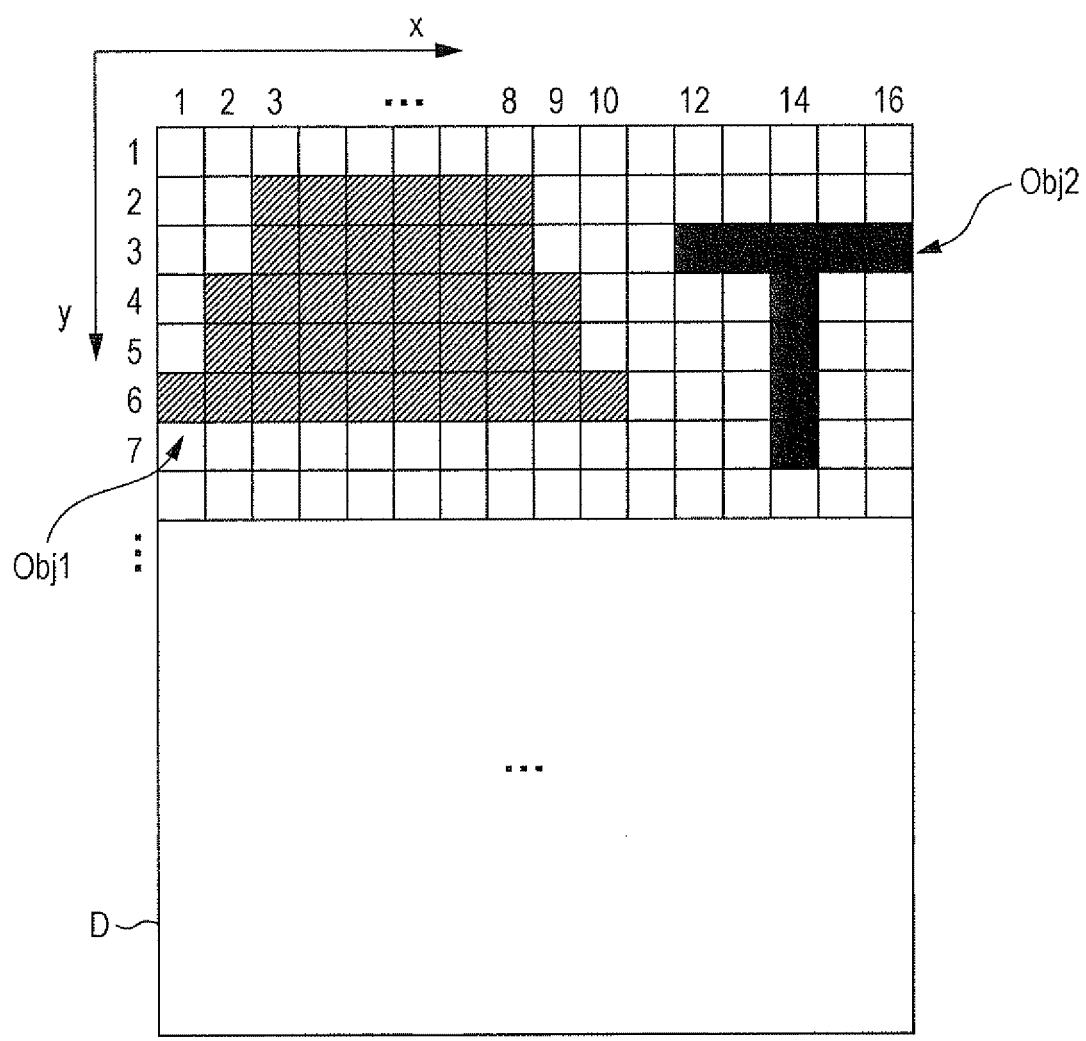
FIG. 4 is a diagram schematically illustrating an example of a document to be printed.

A specific example of intermediate data will be described below with reference to FIGS. 4 and 5. FIG. 4 is a diagram schematically illustrating an example of a document to be printed. FIG. 5 illustrates an example of intermediate data corresponding to the document illustrated in FIG. 4. It is assumed that a document D illustrated in FIG. 4 includes one page and also includes two objects Obj1 (shaded part) and Obj2 (black part). Referring to FIG. 4, ruled lines included in the document D are illustrated merely for the purpose of explanation and do not constitute the document D. It is assumed that PDL representing the document D includes descriptions about a color, a position, a shape, and a size of each of the objects Obj1 and Obj2. It is also assumed that the position of the object is represented by coordinates having an x axis extending in a horizontal direction and a y axis extending in a vertical direction with respect to an origin located at an upper left corner of the document D. FIG. 5 illustrates an example of intermediate data resulting from interpretation of the PDL of the document D illustrated in FIG. 4 performed by the interpretation unit 26. Referring to FIG. 5, each intermediate data for Y, M, C, or K includes drawing commands of the object Obj1 (lines 1 to 6) and drawing commands of the object Obj2 (lines 7 to 11). Each row of the drawing commands corresponds to one scanning line (one row along the x-axis direction in FIG. 4) in a printed image of the document D. The intermediate data illustrated in FIG. 5 includes drawing commands written in formats "line", "duplicate", and "window". Each format has a following meaning.

1) line, ym, xl, xr, c
   On a scanning line specified by the y coordinate "ym", draw a line from the x coordinate "xl" to the x coordinate "xr−1" using a grayscale "c".
2) duplicate
   Draw a line in the same manner (the same x-coordinate range and the same grayscale) as the most recently drawn scanning line.
3) window, xl, xr
   Draw a line from the x coordinate "xl" to the x coordinate "xr−1" using the same grayscale as that of the most recently drawn scanning line.

As illustrated in FIG. 5, intermediate data of one page can be considered as a set of commands that represents a procedure for drawing each object constituting the page. An amount of intermediate data representing one page is less than an amount of raster data that includes a value of each pixel constituting the page.

Intermediate data may further represent a top/bottom relationship between objects in a printed image. The top/bottom relationship between objects indicates a top/bottom relationship in a hierarchical structure of images. More specifically, in the relationship between objects, "top" indicates a visible side (i.e., a proximal side for a viewer and also referred to as a foreground side), whereas "bottom" indicates a non-visible side (i.e., a distal side for a viewer and also referred to as a background side). Accordingly, for example, an expression "An object B is arranged over an object A" indicates that the object B is arranged on the visible side (on the foreground side) of the object A. For example, the top/bottom relationship between objects may be represented by writing, in intermediate data, drawing commands of the objects sequentially from an object that is to be arranged at the bottom (or at the top) in the printed image.

The drawing processing apparatus 30 to be described later generates drawing data in accordance with the intermediate data in hardware processing. Accordingly, a format of the intermediate data may differ from the one illustrated in FIG. 5 as long as the format represents a drawing procedure in which the drawing data can be generated in hardware processing. For example, the intermediate data at least includes information specifying ON/OFF of a bit on a memory (temporary storage) corresponding to each pixel included in an image to be printed.

Referring back to FIG. 3, the intermediate data output 262 outputs the intermediate data generated by the intermediate data generator 260 to the drawing processing apparatus 30. The intermediate data output by the intermediate data output 262 is written in the intermediate data spooler 31 of the drawing processing apparatus 30. The intermediate data spooler 31 is a storage device that stores intermediate data. The activation controller 34 monitors an amount of intermediate data written in the intermediate data spooler 31. If the amount of intermediate data exceeds a previously set threshold θ1, the activation controller 34 instructs the drawing data generators 32*a*, 32*b*, and so forth to start reading out the intermediate data from the intermediate data spooler 31. Furthermore, if the amount of intermediate data written in the intermediate data spooler 31 exceeds the threshold θ1, the activation controller 34 activates the printer 40. As the threshold θ1, for example, a value representing a given percentage of storage capacity of the intermediate data spooler 31 may be set. For example, when the threshold θ1 is set equal to 50%, once the amount of intermediate data written in the intermediate data spooler 31 by the interpretation units 26 exceeds 50% of the storage capacity of the intermediate data spooler 31, the activation controller 34 causes intermediate data acquiring parts 320 to start reading out the intermediate data and also activates the printer 40. Each of the drawing data generators 32*a*, 32*b*, and so forth reads out the intermediate data stored in the intermediate data spooler 31 in response to the instruction of the activation controller 34 and generates drawing data in accordance with the read out intermediate data. In this exemplary embodiment, each drawing data generator 32 reads out the intermediate data from the intermediate data spooler 31 on a page-by-page basis and generates raster data of one page.

Meanwhile, a specific value of the threshold θ1 may be decided by determining the value from an experiment or simulation so that, with the value, printing does not stop because of delay in generation of raster data even if the printer 40 performs printing using generated raster data while the drawing data generators 32 are generating the raster data in accordance with the intermediate data.

FIG. 6 illustrates an example of a configuration of the drawing data generator 32. Each of the drawing data generators 32*a*, 32*b*, and so forth illustrated in FIG. 3 has the configuration to be described below with reference to FIG. 6.

Referring to FIG. 6, the drawing data generator 32 includes the intermediate data acquiring part 320, a drawing part 322, and a gamma correction/halftone processing part 324. Upon being instructed to start reading out the intermediate data by the activation controller 34, the intermediate data acquiring part 320 reads out and acquires the intermediate data stored in the intermediate data spooler 31 on a page-by-page basis and supplies the acquired intermediate data to the drawing part 322. The intermediate data acquiring part 320 may acquire the intermediate data of one page or of plural pages in one operation.

The drawing part 322 generates drawing data in accordance with the intermediate data supplied by the intermediate data acquiring part 320. The drawing data generated in this exemplary embodiment is raster data including pixel values of the primary colors of pixels constituting a printed image. In this exemplary embodiment, the intermediate data of one page includes pieces of intermediate data for the respective primary colors (Y, M, C, and K). The drawing part 322 generates drawing data of the page for each primary color from the intermediate data of the corresponding page. Meanwhile, functions of the drawing part 322 are realized by hardware processing using the aforementioned hardware components, such as a DRP and an ASIC.

The gamma correction/halftone processing part 324 performs gamma correction and halftone processing on the drawing data generated by the drawing part 322. The gamma correction/halftone processing part 324 performs gamma correction using a parameter acquired from the printer 40. The drawing data of each primary color resulting from the processing performed by the gamma correction/halftone processing part 324 is output to the printer 40. Using this drawing data, an image of each primary color is printed by the printer 40. Meanwhile, functions of the gamma correction/halftone processing part 324 are realized by hardware processing using the aforementioned hardware components, such as a DRP and an ASIC.

Figure 7:
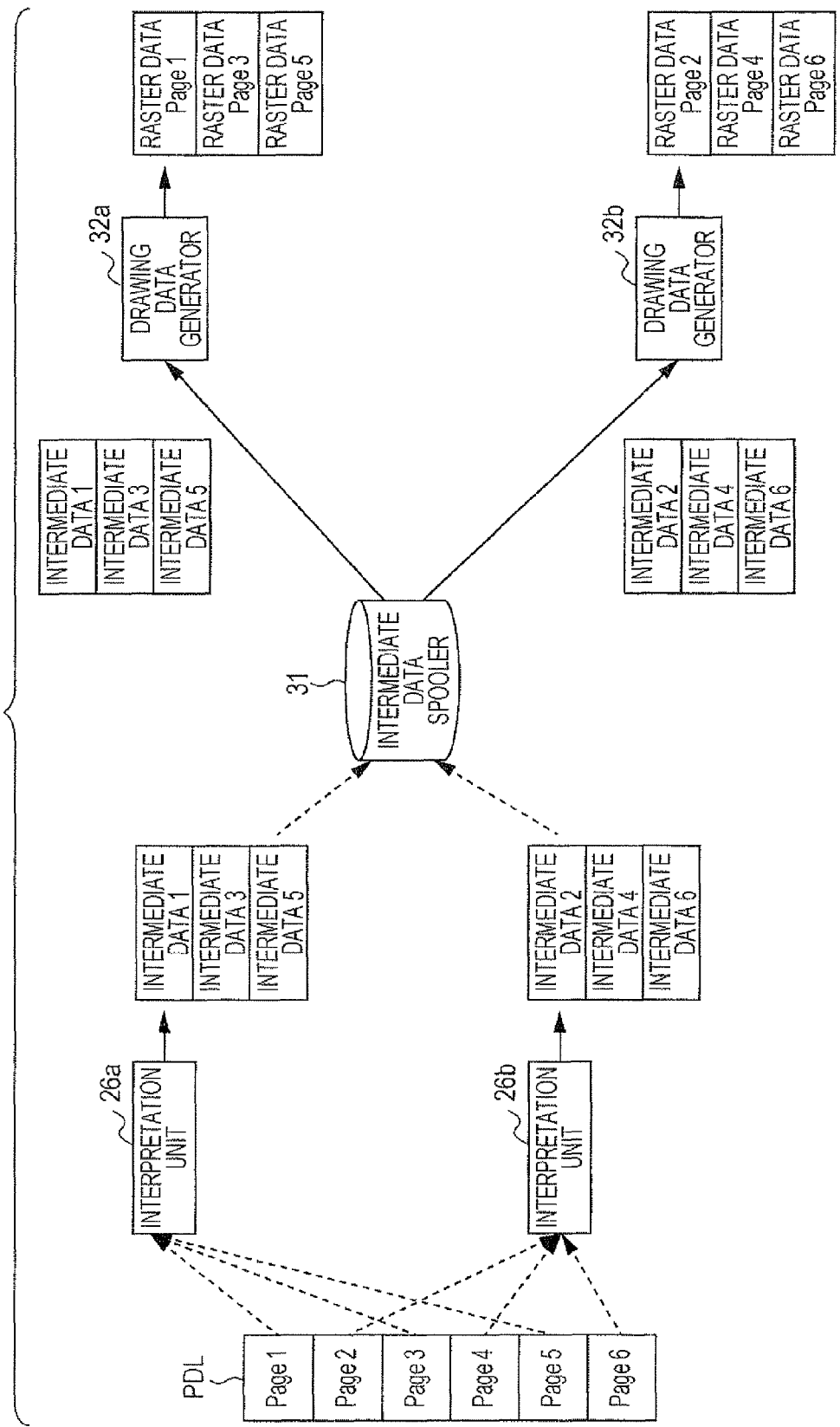
FIG. 7 is a diagram illustrating an example of an overview of data processing performed by interpretation units and drawing data generators.

An example of an overview of data processing performed by the interpretation units 26 of the print job processing apparatus 20 and the drawing data generators 32 of the drawing processing apparatus 30 will be described with reference to FIG. 7. In the example of FIG. 7, the print job processing apparatus 20 includes two interpretation units 26a and 26b. The drawing processing apparatus 30 includes two drawing data generators 32a and 32b. Additionally, FIG. 7 illustrates an example case of processing PDL of a document including six pages, i.e., pages 1 to 6. Referring to FIG. 7, a broken-line arrow directed to the interpretation unit 26a or 26b from each of pages 1 to 6 represents the interpretation unit 26 that is to process the page. More specifically, pages 1, 3, and 5 are processed by the interpretation unit 26a, whereas pages 2, 4, and 6 are processed by the interpretation unit 26b. Each interpretation unit 26 interprets the PDL to generate intermediate data of the page assigned thereto. For example, the interpretation unit 26a generates intermediate data 1 for page 1, intermediate data 3 for page 3, and intermediate data 5 for page 5. The interpretation unit 26b generates intermediate data 2 for page 2, intermediate data 4 for page 4, and intermediate data 6 for page 6. Although an illustration is omitted in FIG. 7, each of the pieces of intermediate data 1 to 6 for pages 1 to 6, respectively, includes intermediate data for each of the primary colors (Y, M, C, and K). The pieces of intermediate data 1 to 6 generated by the interpretation units 26a and 26b are output to and stored in the intermediate data spooler 31.

The drawing data generators 32a and 32b read out and acquire the intermediate data from the intermediate data spooler 31 on a page-by-page basis. In the example of FIG. 7, the drawing data generator 32a acquires the intermediate data 1, the intermediate data 3, and the intermediate data 5 that have been generated and stored in the intermediate data spooler 31 by the interpretation unit 26a. The drawing data generator 32b acquires the intermediate data 2, the intermediate data 4, and the intermediate data 6 that have been generated and stored in the intermediate data spooler 31 by the interpretation unit 26b. Each of the drawing data generators 32a and 32b generates raster data of a page using the acquired intermediate data. For example, the drawing data generator 32a generates pieces of raster data for page 1, page 3, and page 5 using the intermediate data 1, the intermediate data 3, and the intermediate data 5, respectively. The drawing data generator 32b generates pieces of raster data for page 2, page 4, and page 6 using the intermediate data 2, the intermediate data 4, and the intermediate data 6, respectively. Although an illustration is omitted in FIG. 7, the raster data for each of pages 1 to 6 includes raster data for each of the primary colors (Y, M, C, and K). The pieces of raster data for pages 1 to 6 generated by the drawing data generators 32a and 32b are output to the printer 40.

Figure 8:
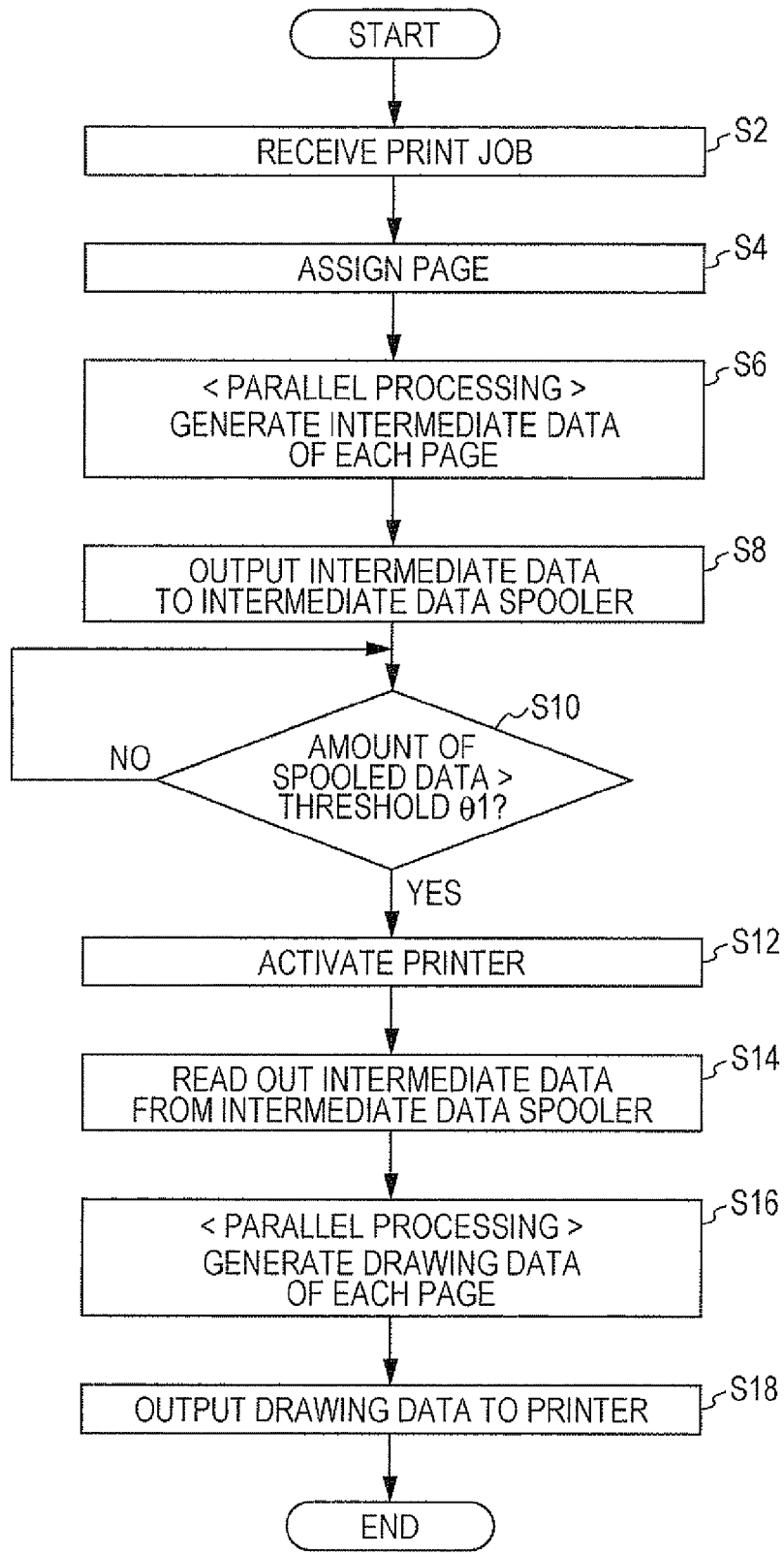
FIG. 8 is a flowchart illustrating an example of a processing procedure performed in an image processing system.

An example of an operation performed by the image processing system according to the first exemplary embodiment will be described with reference to FIG. 8. FIG. 8 is a flowchart illustrating an example of a processing procedure performed in the print job processing apparatus 20 and the drawing processing apparatus 30. Processing in steps S2 to S8 of the procedure illustrated in FIG. 8 is performed by the print job processing apparatus 20, whereas processing in steps S10 to S18 is performed by the drawing processing apparatus 30.

First, the print job receiving unit 22 of the print job processing apparatus 20 receives a print job from the terminal apparatus 10 (step S2).

Next, the assignment processing unit 24 decides the interpretation unit 26 that is to process a page included in PDL, which is included in the print job received in step S2, in accordance with operation states of the interpretation units 26. That is, the assignment processing unit 24 assigns each page included in the PDL to corresponding one of the interpretation units 26 (step S4).

Each of the interpretation units 26 acquires notification about the page assigned thereto in step S4 and the PDL to be processed from the assignment processing unit 24. Each of the interpretation units 26 then interprets the acquired PDL to identify the page assigned thereto and generates intermediate data of the identified page for each primary color (step S6). In step S6, parallel processing is performed by the plural interpretation units 26 on a page-by-page basis.

Each of the interpretation units 26 outputs the generated intermediate data to the intermediate data spooler 31 of the drawing processing apparatus 30 (step S8). In the processing in step S8, the intermediate data generated by each of the interpretation units 26 is written and stored in the intermediate data spooler 31.

The activation controller 34 of the drawing processing apparatus 30 stands by until an amount of intermediate data written in the intermediate data spooler 31 exceeds a previously set threshold θ1 (processing loop for NO in step S10). If the amount of intermediate data exceeds the threshold θ1 (YES in step S10), the activation controller 34 activates the printer 40 (step S12). More specifically, for example, the activation controller 34 sends a control signal for instructing activation to the printer 40 in step S12. Upon receiving this control signal, the printer 40 prepares for printing and waits for drawing data in a state in which the printer 40 can start printing in response to reception of the drawing data from the drawing data generators 32.

The activation controller 34 further instructs each of the drawing data generators 32 to start reading out the intermediate data from the intermediate data spooler 31. In response to this instruction, the intermediate data acquiring part 320 of each of the drawing data generators 32 reads out the intermediate data stored in the intermediate data spooler 31 on a page-by-page basis and supplies the read out intermediate data to the drawing part 322 (step S14).

The drawing data generator 32 that has acquired the intermediate data of each page from the intermediate data spooler 31 generates raster data of the page using the acquired intermediate data (step S16). More specifically, in step S16, for example, the drawing part 322 of each drawing data generator 32 processes the acquired intermediate data and determines a value of each pixel constituting a printed image for each of the primary colors (Y, M, C, and K) to generate the raster data. The gamma correction/halftone processing part 324 performs gamma correction and halftone processing on the generated raster data. In step S16, the plural drawing data generators 32a, 32b, and so forth perform parallel processing to generate the pieces of raster data of different pages.

The raster data of each page resulting from the gamma correction and the halftone processing performed in each of the drawing data generators 32 is output to the printer 40 (step S18).

An amount of intermediate data, for a unit area (e.g., one page) of a print medium, spooled (i.e., stored in a storage device) in the aforementioned first exemplary embodiment is less than an amount of raster data for the unit area. Accordingly, in the first exemplary embodiment, a possibility that printing stops because of delay in generation of raster data is reduced by using a smaller storage area than a technique for spooling raster data.

The threshold $\theta 1$ for the amount of intermediate data stored in the intermediate data spooler 31 used in determination performed in step S10 of the procedure illustrated in FIG. 8 may change depending on a ratio of the speed at which the drawing data generators 32 generate the raster data from the intermediate data to the speed at which the printer 40 performs printing. Since the processing for generating the raster data from the intermediate data is hardware processing as described above, the speed of the hardware processing is estimated more easily than the speed of software processing. For example, in the hardware processing for generating the raster data from the intermediate data, a value of each pixel included in the raster data is written in a memory area for the pixel. Accordingly, the speed of the hardware processing is proportional to the number of pixels included in the raster data. On the other hand, for example, the speed of software processing for generating the intermediate data from the PDL performed by the interpretation units 26 may greatly change depending on the number of objects included in the PDL and types of the objects. Accordingly, it is not easy to estimate the speed of the software processing for generating the intermediate data from the PDL in a technique for generating raster data from PDL through intermediate data, spooling (storing) the generated raster data (in a storage device), and performing printing by the printer 40 once an amount of spooled raster data exceeds a previously set threshold. For this reason, it is considered that a threshold including a margin has to be set in order to avoid interruption of printing caused by delay in generation of the raster data. For example, activation of the printer 40 may be waited until 80% to 90% of the entire PDL of the print job is converted into the raster data. In contrast, in the first exemplary embodiment in which the intermediate data is spooled, a minimal value, which guarantees that interruption of printing is avoided even if printing is started in accordance with the ratio of the speed of printing to the speed of the processing for generating the raster data from the intermediate data while generation of the raster data is underway, is determined and is set as the threshold $\theta 1$ for the amount of spooled intermediate data. That is, the threshold including the margin does not have to be set unlike the case of spooling the raster data.

The intermediate data will be described from another viewpoint. The intermediate data may be generated in a format from which "the minimal value, which guarantees that interruption of printing is avoided even if printing is started in accordance with the ratio of the speed of printing to the speed of the processing for generating the raster data from the intermediate data while generation of raster data is underway," can be determined as the threshold $\theta 1$. The specific example of the intermediate data described above with reference to FIG. 4 and FIG. 5 is merely an example of the intermediate data in such a format. Additionally, as an example of such a format, a format can be used in which coordinates of each object in a PDL coordinate system are represented by coordinates in a coordinate system of a device that realizes the hardware processing of the drawing data generators 32. For example, in PDL, coordinates of each object are represented in a coordinate system set by users. When hardware generates raster data, the coordinates in the coordinate system set by users have to be converted into the coordinates in the coordinate system of the device. For example, the intermediate data may be data resulting from the conversion processing from the PDL coordinate system set by users into the coordinate system of the device. For example, when coordinate values are represented by floating-point numbers in the coordinate system set by users and coordinate values are represented by integers in the coordinate system of the device, data obtained by replacing the coordinate values represented by the floating-point numbers written in the PDL with the coordinate values represented by the integers through the coordinate-system conversion can be used as the intermediate data.

The processing for generating the raster data from the intermediate data performed by the drawing data generators 32 of the drawing processing apparatus 30 applies lower processing load than the processing for interpreting the PDL to generate the intermediate data performed by the interpretation units 26 of the print job processing apparatus 20. For example, in a case in which print data is re-printed after being printed once and the already-generated intermediate data for the print data is spooled, the drawing data generators 32 re-generate the raster data from the already-generated intermediate data. In such a case, re-printing is performed without the processing for generating the intermediate data performed by the interpretation units 26. Accordingly, when the intermediate data is spooled, re-printing is performed with lower processing load than a case in which the intermediate data is generated from the PDL and then the raster data is generated from the intermediate data. Meanwhile, the re-printing is performed, for example, when a re-print instruction is issued from the terminal apparatus 10 or when printing is performed again because of failures (such as paper jam) of the printer 40.

Additionally, the intermediate data is data to be subjected to the gamma correction/halftone processing. Accordingly, if parameters of the gamma correction/halftone processing are changed between spooling of the intermediate data and re-printing because the printer 40 is changed or the property of the printer 40 changes as time passes, the gamma correction/halftone processing part 324 performs the processing simply using new updated parameters in the processing for generating the raster data from the intermediate data performed by the drawing data generators 32. In contrast, in a technique for spooling raster data resulting from the gamma correction/halftone processing, processing for generating the intermediate data from the PDL and then generating the raster data from the intermediate data has to be re-executed if the parameters are changed before re-printing is performed. However, in the first exemplary embodiment, the processing for generating the intermediate data from the PDL is omitted at the time of re-printing. Additionally, the intermediate data spooled in the aforementioned manner may be used in printing performed by another printer having the same or substantially the same resolution as the printer 40. For example, when the printer 40 is mechanically damaged, the raster data generated from the spooled intermediate data may be output to another printer having the same or substantially the same resolution as the printer 40 and printing may be performed therein.

Second Exemplary Embodiment

Figure 9:
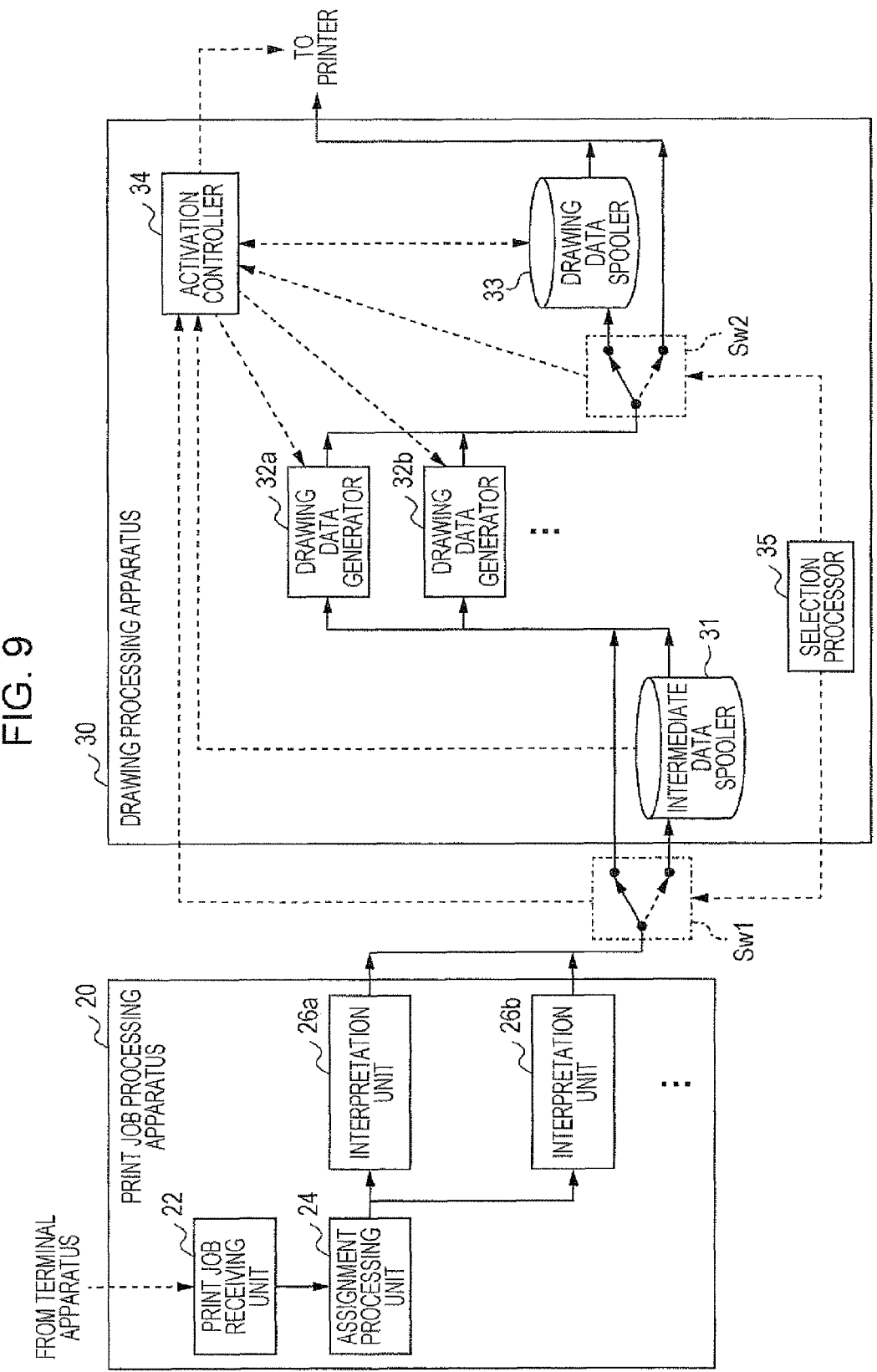
FIG. 9 is a block diagram illustrating another example of functional configurations of a print job processing apparatus and a drawing processing apparatus.

FIG. 9 illustrates an example of functional configurations of a print job processing apparatus 20 and a drawing processing apparatus 30 according to a second exemplary embodiment. In FIG. 9, components similar to those illustrated in FIG. 3 according to the first exemplary embodiment are represented by references similar to those in FIG. 3 and a detailed description thereof is omitted. A configuration of the print job processing apparatus 20 illustrated in FIG. 9 is similar to that of the print job processing apparatus 20 illustrated in FIG. 3 according to the first exemplary embodiment. The drawing processing apparatus 30 illustrated in FIG. 9 includes a drawing data spooler 33 and a selection processor 35 in addition to components similar to those illustrated in FIG. 3.

The drawing data spooler 33 is a storage device that stores drawing data (raster data) generated by drawing data generators 32.

The selection processor 35 receives user input for selecting whether to spool intermediate data or raster data. In accordance with selection of the user indicated by the received input, the selection processor 35 decides which of an intermediate data spooler 31 or the drawing data spooler 33 is to be used. The user input is received via an input device connected to the drawing processing apparatus 30, for example. Alternatively, when a user sends a print job to the print job processing apparatus 20 using a terminal apparatus 10, the terminal apparatus 10 may receive input for selecting spooling of intermediate data or spooling of raster data and may include information indicating the selection result in the print job. In this example case, the print job processing apparatus 20 acquires the information indicating selection about spooling of intermediate data or spooling of raster data from the print job and notifies the selection processor 35 of the drawing processing apparatus 30 of the selection. When spooling of intermediate data is selected, the selection processor 35 makes a setting so that intermediate data output from interpretation units 26 is written in the intermediate data spooler 31 and raster data is output to a printer 40 from the drawing data generators 32 as in the above-described first exemplary embodiment. When spooling of raster data is selected, the selection processor 35 makes a setting so that intermediate data output from the interpretation units 26 is directly supplied to the drawing data generators 32, instead of via the intermediate data spooler 31, and raster data output by the drawing data generators 32 is written in the drawing data spooler 33. The selection processor 35 may make the setting in a following manner. For example, switches Sw1 and Sw2 for switching a data flow are provided. The selection processor 35 operates the switches Sw1 and Sw2 to make the setting.

When spooling of intermediate data is selected, an activation controller 34 of the drawing processing apparatus 30 according to the second exemplary embodiment performs control similar to that performed in the above-described first exemplary embodiment. More specifically, if an amount of intermediate data written in the intermediate data spooler 31 exceeds a previously set threshold $\theta 1$, the activation controller 34 instructs the drawing data generators 32 to read out the intermediate data from the intermediate data spooler 31 and also activates the printer 40. When spooling of raster data is selected, the activation controller 34 monitors an amount of raster data written in the drawing data spooler 33 from the drawing data generators 32. If the amount of spooled raster data exceeds a previously set threshold $\theta 2$, the activation controller 34 activates the printer 40. As the threshold $\theta 2$, a value representing a percentage of storage capacity of the drawing data spooler 33 may be set. Additionally, the threshold $\theta 2$ may be decided by previously determining a value from an experiment or simulation so that, with the value, printing does not stop because of delay in generation of raster data even if the printer 40 performs printing using generated raster data while the interpretation units 26 are interpreting PDL included in a print job to generate intermediate data and the drawing data generators 32 are generating the raster data from the intermediate data.

Since an amount of raster data for a unit area on a printed medium is larger than an amount of intermediate data for the unit area, a larger value is set as the threshold $\theta 2$ for the amount of raster data written in the drawing data spooler 33 than the threshold $\theta 1$ for the amount of intermediate data written in the intermediate data spooler 31. For example, when the intermediate data spooler 31 and the drawing data spooler 33 have the same storage capacity, the threshold $\theta 1$ may be set equal to 40% of the storage capacity, whereas the threshold $\theta 2$ may be set equal to 80% of the storage capacity.

Figure 10:
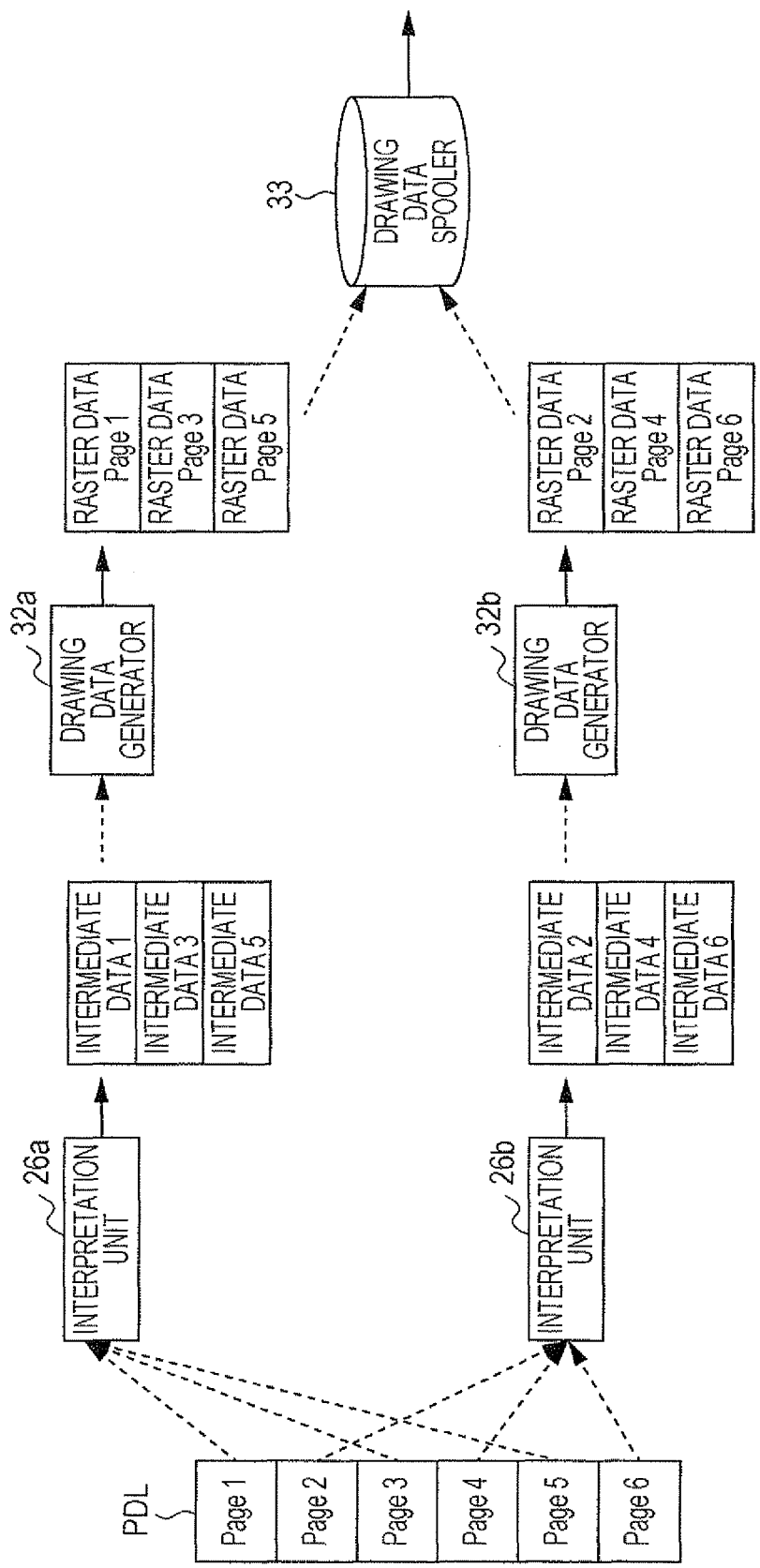
FIG. 10 is a diagram illustrating another example of an overview of data processing performed by interpretation units and drawing data generators.

An example of an overview of data processing performed in the print job processing apparatus 20 and the drawing processing apparatus 30 when spooling of drawing data is selected in the second exemplary embodiment will be described with reference to FIG. 10. In the example of FIG. 10, the print job processing apparatus 20 includes two interpretation units 26a and 26b. The drawing processing apparatus 30 includes two drawing data generators 32a and 32b. FIG. 10 illustrates an example case of processing PDL of a document including six pages, i.e., pages 1 to 6. Referring to FIG. 10, a broken-line arrow directed to the interpretation unit 26a or 26b from each of pages 1 to 6 represents the interpretation unit 26 that is to process the page. More specifically, the interpretation unit 26a generates intermediate data 1 for page 1, intermediate data 3 for page 3, and intermediate data 5 for page 5. The interpretation unit 26b generates intermediate data 2 for page 2, intermediate data 4 for page 4, and intermediate data 6 for page 6. The intermediate data 1, the intermediate data 3, and the intermediate data 5 generated by the interpretation unit 26a are supplied to the drawing data generator 32a, whereas the intermediate data 2, the intermediate data 4, and the intermediate data 6 generated by the interpretation unit 26b are supplied to the drawing data generator 32b. The drawing data generator 32a generates pieces of raster data for pages 1, 3, and 5 in accordance with the intermediate data 1, the intermediate data 3, and the intermediate data 5, respectively. The drawing data generator 32b generates pieces of raster data for pages 2, 4, and 6 in accordance with the intermediate data 2, the intermediate data 4, and the intermediate data 6, respectively. The pieces of raster data generated by the drawing data generators 32*a* and 32*b* are output to and stored in the drawing data spooler 33.

Meanwhile, an overview of data processing performed when spooling of intermediate data is selected in the second exemplary embodiment may be similar to that described with reference to FIG. 7 in accordance with the aforementioned first exemplary embodiment.

Figure 11:
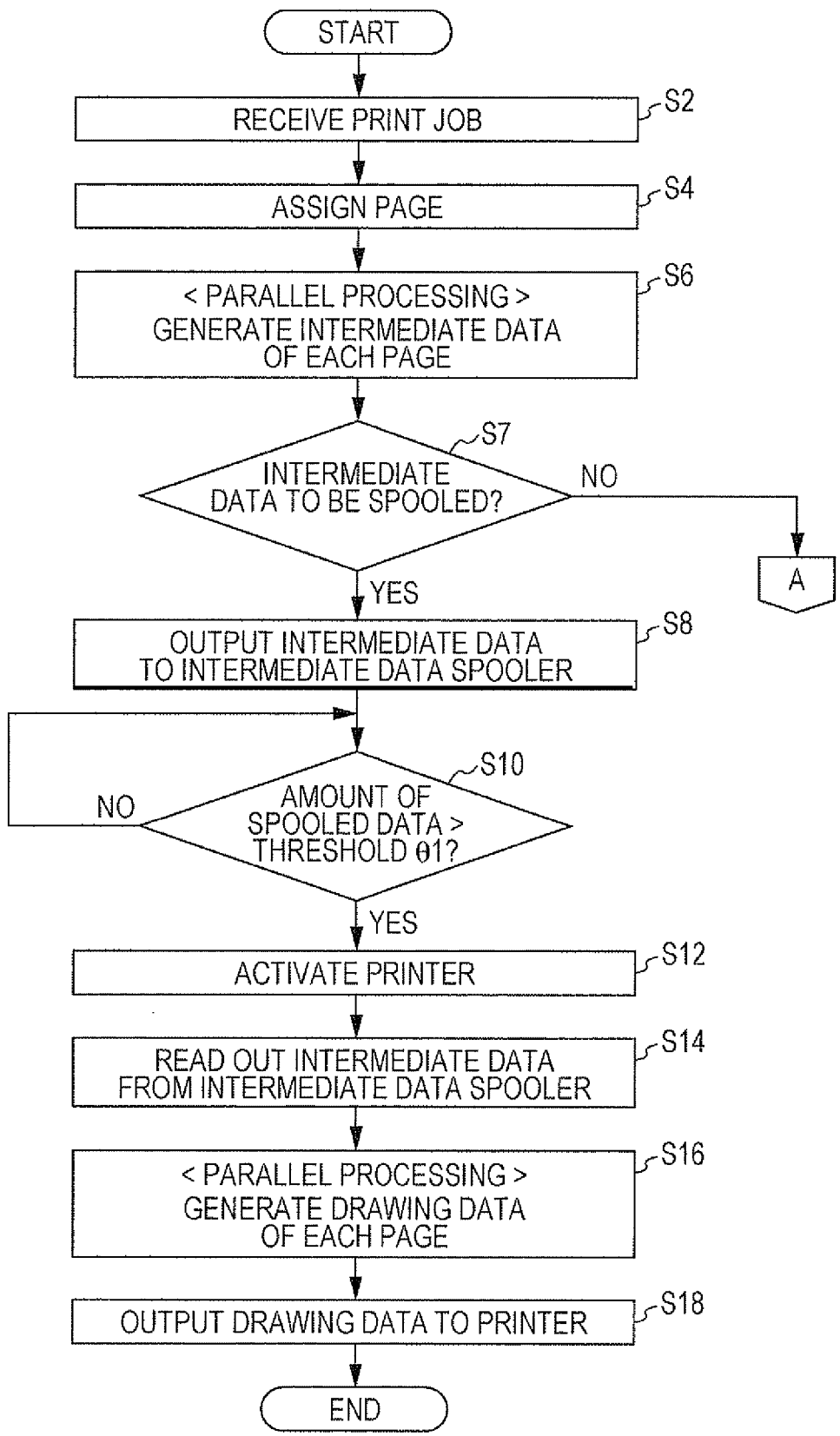
FIG. 11 is a flowchart illustrating another example of a processing procedure performed in an image processing system.

An example of an operation performed by an image processing system according to the second exemplary embodiment will be described with reference to FIGS. 11 and 12. Some processing steps of the procedure illustrated in FIG. 11 are similar to those of the procedure illustrated in FIG. 8 according to the first exemplary embodiment. In FIG. 11, the processing steps similar to those in FIG. 8 are represented by references similar to those in FIG. 8.

Referring first to FIG. 11, a print job receiving unit 22 of the print job processing apparatus 20 receives a print job (step S2), an assignment processing unit 24 assigns each page (step S4), and the interpretation units 26 generate the intermediate data (step S6) in a manner similar to that described in steps S2 to S6 with reference to FIG. 8, respectively.

If the selection processor 35 of the drawing processing apparatus 30 receives input for selecting spooling of intermediate data (YES in step S7) after the intermediate data is generated in step S6, the process proceeds to step S8. In step S8, the intermediate data is output to the intermediate data spooler 31. Since processing in steps S8 to S18 illustrated in FIG. 11 is similar to that in steps S8 to S18 illustrated in FIG. 8, respectively, a detailed description thereof is omitted.

Figure 12:
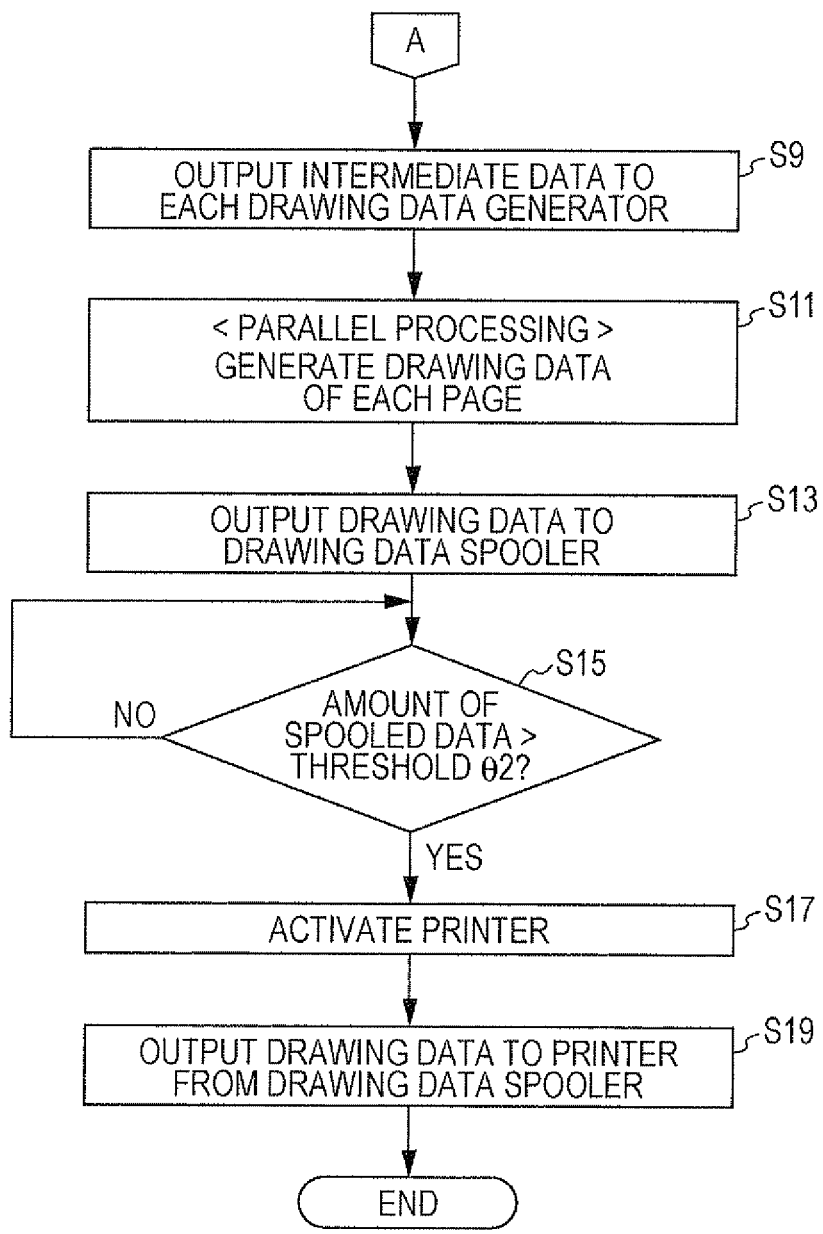
FIG. 12 is a flowchart illustrating the other example of the processing procedure performed in the image processing system.

If the selection processor 35 receives input for selecting spooling of drawing data (NO in step S7), the process proceeds to step S9 in FIG. 12. Referring now to FIG. 12, the intermediate data generated by each interpretation unit 26 is output to the corresponding drawing data generator 32 of the drawing processing apparatus 30 (step S9). In step S9, each of the plural interpretation units 26 outputs the generated intermediate data to corresponding one of the plural drawing data generators 32. Which interpretation unit 26 outputs the intermediate data to which drawing data generator 32 may be decided in advance or may be dynamically decided in accordance with operation states of the drawing data generators 32. When the correspondence is decided in advance, an intermediate data acquiring part 320 of each drawing data generator 32 acquires the intermediate data output from the corresponding interpretation unit 26 and supplies the acquired intermediate data to a drawing part 322. When the correspondence is dynamically decided in accordance with the operation states of the drawing data generators 32, for example, the activation controller 34 checks the operation state of each drawing data generator 32. The pieces of intermediate data output from the interpretation units 26 are sequentially assigned preferentially to the drawing data generator 32 that is not executing a process or that is executing a process, processing load of which is lower than other processes performed by other drawing data generators 32. The intermediate data acquiring part 320 of each drawing data generator 32 acquires the intermediate data in accordance with the correspondence decided by the activation controller 34 and supplies the acquired intermediate data to the drawing part 322. Meanwhile, in any of the aforementioned examples, it is assumed that each drawing data generator 32 acquires the intermediate data on a page-by-page basis.

Each drawing data generator 32 that has acquired the intermediate data of a page from the corresponding interpretation unit 26 generates raster data of the page using the acquired intermediate data (step S11). More specifically, in step S11, the plural drawing data generators 32*a*, 32*b*, and so forth perform parallel processing to generate pieces of raster data of different pages as in step S16 illustrated in FIG. 8.

Each drawing data generator 32 outputs the generated raster data to the drawing data spooler 33 (step S13). In the processing in step S13, the raster data generated by each drawing data generator 32 is written and stored in the drawing data spooler 33.

The activation controller 34 stands by until an amount of raster data written in the drawing data spooler 33 exceeds a previously set threshold θ2 (processing loop for NO in step S15). If the amount of spooled raster data exceeds the threshold θ2 (YES in step S15), the activation controller 34 activates the printer 40 (step S17). More specifically, in step S17, the activation controller 34 sends a control signal for instructing activation to the printer 40, for example. Upon receiving this control signal, the printer 40 prepares for printing and waits for raster data.

After activating the printer 40, the activation controller 34 causes the drawing data spooler 33 to output the raster data to the printer 40 (step S19).

In the above-described second exemplary embodiment, the intermediate data or the raster data is spooled in accordance with user selection. In both cases of spooling intermediate data and spooling raster data, the printer 40 starts printing after the amounts of data spooled in the intermediate data spooler 31 and the drawing data spooler 33 exceed the thresholds θ1 and θ2, respectively, each of which is set so that interruption of printing caused by delay in generation of raster data is avoided. Accordingly, in both cases of spooling intermediate data and spooling raster data, a possibility that printing stops because of delay in generation of raster data is reduced.

In addition, some users of the image processing system may wish to leave a record of data that has been actually printed. In such a case, if the users select spooling of raster data, the record of the raster data that has been actually used in printing is left in the drawing data spooler 33 in the second exemplary embodiment.

Figure 13:
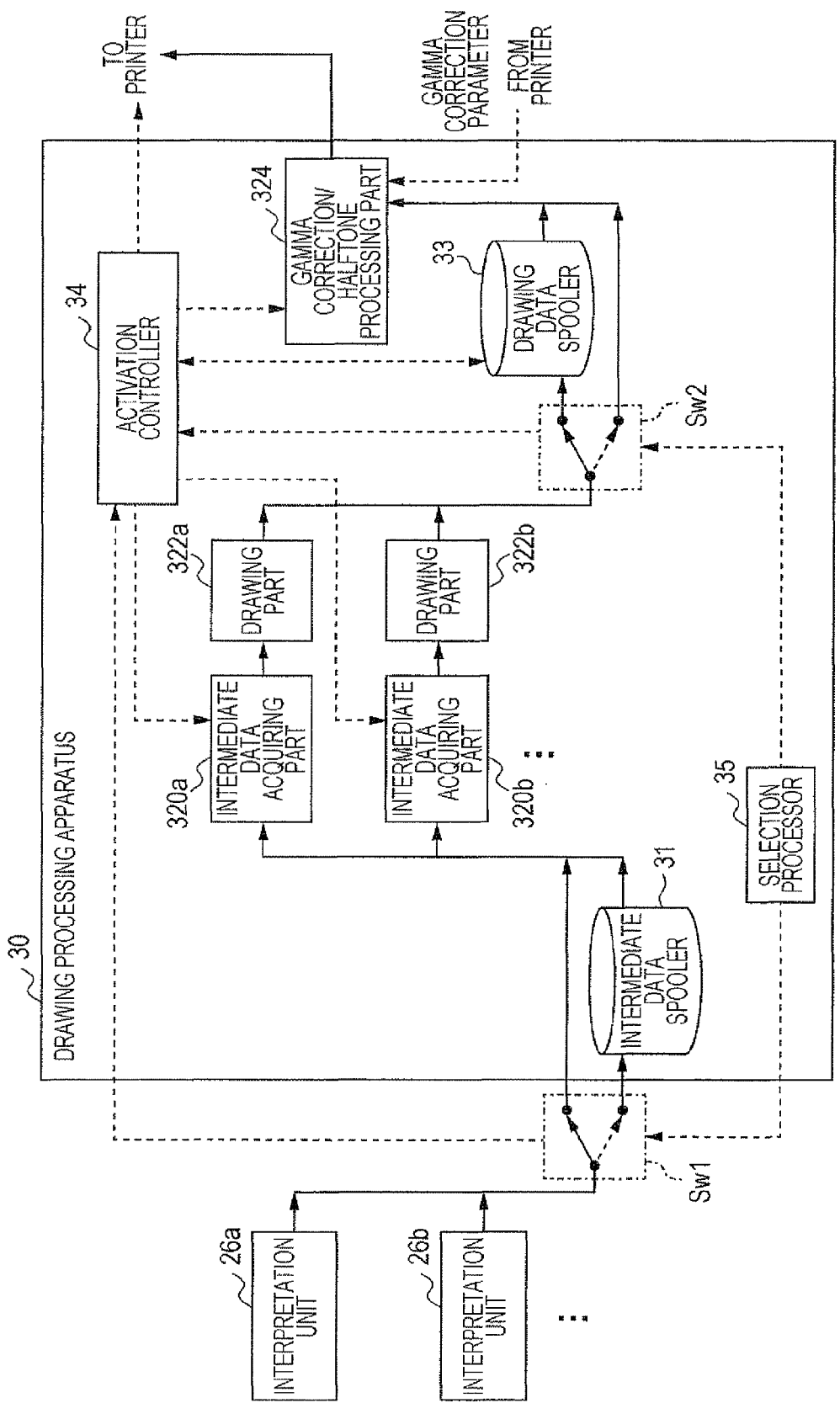
FIG. 13 is a block diagram illustrating still another example of a functional configuration of a drawing processing apparatus.

In a modification of the second exemplary embodiment, raster data to be subjected to gamma correction/halftone processing may be stored in the drawing data spooler 33. FIG. 13 illustrates an example of a functional configuration of the drawing processing apparatus 30 according to this modification. The drawing processing apparatus 30 illustrated in FIG. 13 includes plural pairs of the intermediate data acquiring part 320 and the drawing part 322. The drawing processing apparatus 30 is configured so that raster data resulting from processing performed by each of the plural drawing parts 322*a*, 322*b*, and so forth can be output to the drawing data spooler 33 or the gamma correction/halftone processing part 324. Furthermore, the gamma correction/halftone processing part 324 is arranged to be able to acquire the raster data stored in the drawing data spooler 33 or to directly acquire the drawing data output from the drawing parts 322 before performing gamma correction/halftone processing thereon.

When spooling of intermediate data is selected in the example of FIG. 13, intermediate data is spooled in the same manner as that in the example of FIG. 9. Each drawing part 322 outputs raster data resulting from the processing directly to the gamma correction/halftone processing part 324. The gamma correction/halftone processing part 324 performs the gamma correction/halftone processing on the raster data output from each drawing part 322 and then outputs the processed raster data to the printer 40.

When spooling of drawing data is selected in the example of FIG. 13, each drawing part 322 writes raster data resulting from the processing in the drawing data spooler 33. If an amount of raster data stored in the drawing data spooler 33 exceeds the threshold θ2, the activation controller 34 activates the printer 40 and also instructs the gamma correction/halftone processing part 324 to perform the gamma correction/halftone processing on the raster data stored in the drawing data spooler 33. Upon receiving this instruction, the gamma correction/halftone processing part 324 reads out the raster data from the drawing data spooler 33 and performs the gamma correction/halftone processing on the read out raster data. The gamma correction/halftone processing part 324 then outputs the resulting raster data to the printer 40.

Figure 14:
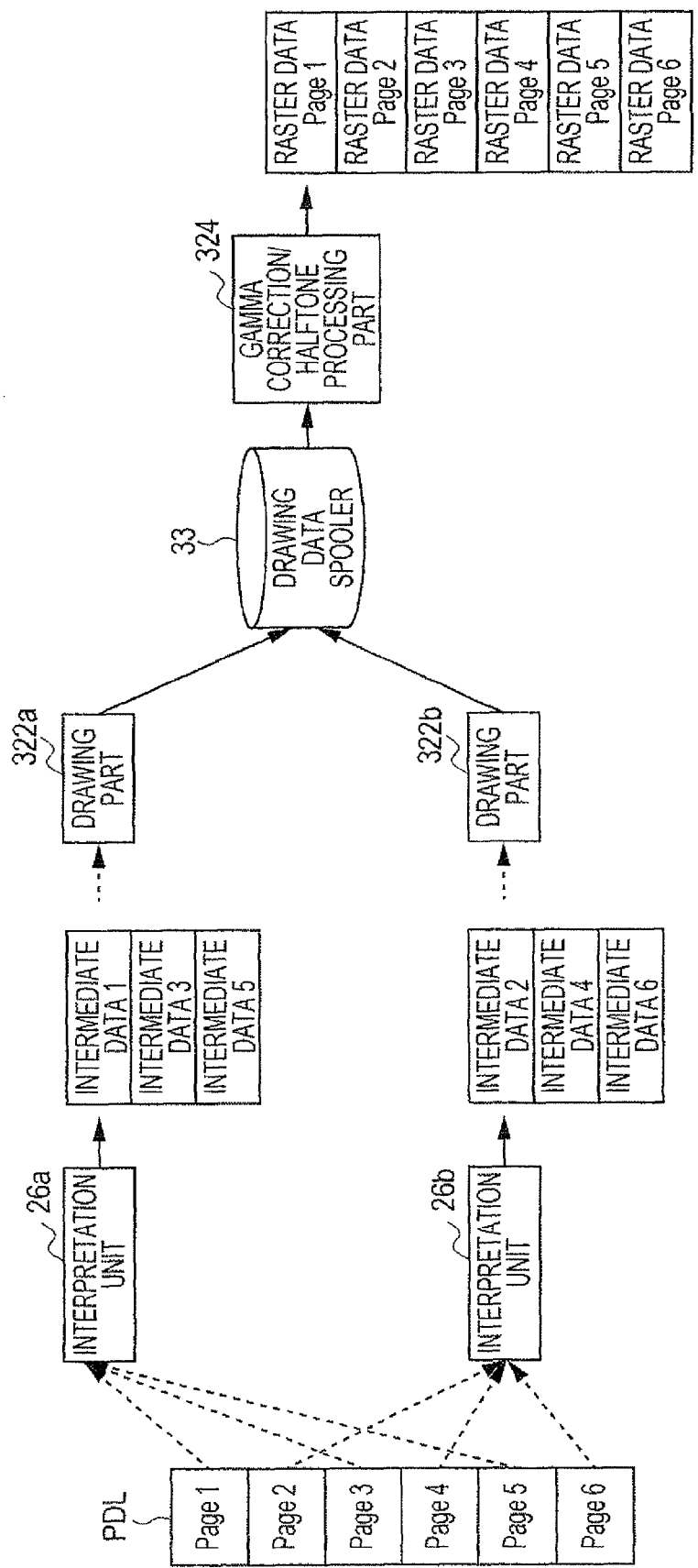
FIG. 14 is a diagram illustrating still another example of an overview of data processing performed by interpretation units and drawing data generators.

An example of an overview of data processing performed when the drawing processing apparatus 30 illustrated in FIG. 13 is used will be described with reference to FIG. 14. In FIG. 14, intermediate data of each page is generated in the interpretation unit 26a or 26b as in the example illustrated in FIG. 10. In the example of FIG. 14, the intermediate data 1, the intermediate data 3, and the intermediate data 5 generated by the interpretation unit 26a are supplied to the drawing part 322a via the intermediate data acquiring part 320a (not illustrated), whereas the intermediate data 2, the intermediate data 4, and the intermediate data 6 generated by the interpretation unit 26b are supplied to the drawing part 322b via the intermediate data acquiring part 320b (not illustrated). Each of the drawing parts 322a and 322b processes the received intermediate data of each page to generate raster data (not illustrated) to be subjected to the gamma correction/halftone processing and writes the raster data in the drawing data spooler 33. Upon receiving the instruction from the activation controller 34, the gamma correction/halftone processing part 324 reads out the raster data of each page from the drawing data spooler 33 and generates pieces of raster data for pages 1 to 6 that have been subjected to the gamma correction/halftone processing.

In the modification described with reference to FIGS. 13 and 14, raster data to be subjected to the gamma correction/halftone processing is spooled in the drawing data spooler 33. Accordingly, even if re-printing is performed after parameters of the gamma correction/halftone processing are changed between a first printing operation and the re-printing operation because the printer 40 is changed or the property of the printer 40 changes as time passes, the gamma correction/halftone processing part 324 performs the processing on the raster data stored in the drawing data spooler 33 but the processing of the drawing parts 322 is omitted before re-printing is performed.

In the description of the second exemplary embodiment and the modification thereof given with reference to FIGS. 9 to 14, the intermediate data spooler 31 and the drawing data spooler 33 are illustrated as different components. However, the intermediate data spooler 31 and the drawing data spooler 33 may be realized by a single storage device. In this case, one storage device is provided in the drawing processing apparatus 30. When spooling of intermediate data is selected, intermediate data is spooled in the storage device. When spooling of drawing data is selected, raster data is spooled in the storage device.

Additionally, the first exemplary embodiment, the second exemplary embodiment, the modification described above are merely exemplary embodiments of the present invention and various modifications other than those described above may occur. For example, in each of the exemplary embodiments and the modification described above, the plural interpretation units 26 and the plural drawing data generators 32 perform parallel processing on a page-by-page basis. However, in another modification, each page may be further divided into bands and parallel processing may be performed on a band-by-band basis. In still another modification, units in which the plural interpretation units 26 perform parallel processing may differ from units in which the plural drawing data generators 32 perform parallel processing. For example, parallel processing may be performed on a page-by-page basis in the plural interpretation units 26, whereas the parallel processing may be performed on a band-by-band basis in the plural drawing data generators 32.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing system comprising:
   a plurality of intermediate data generators each of which interprets an assigned data portion of document data, written in a page description language, to generate intermediate data;
   a first memory that stores the intermediate data generated by each of the plurality of intermediate data generators;
   a plurality of drawing data generators each of which reads out the intermediate data from the first memory and generates drawing data in accordance with the read out intermediate data, the drawing data including information about each pixel included in a printed image;
   a second memory that stores the drawing data generated by each of the plurality of drawing data generators; and
   a receiver that receives user input for selecting one of the first memory and the second memory,
   wherein once an amount of intermediate data stored in the first memory exceeds a first threshold that is set in advance, the plurality of drawing data generators start reading out the intermediate data from the first memory,
   wherein when the receiver receives user input for selecting the first memory, each of the plurality of intermediate data generators writes the generated intermediate data in the first memory and once the amount of intermediate data stored in the first memory exceeds the first threshold, the plurality of drawing data generators start reading out the intermediate data from the first memory, and
   wherein when the receiver receives user input for selecting the second memory, each of the plurality of intermediate data generators supplies the generated intermediate data to one of the plurality of drawing data generators, and each of the plurality of drawing data generators generates the drawing data in accordance with the intermediate data acquired from one of the plurality of intermediate data generators and writes the generated drawing data in the second memory.

2. The image processing system according to claim 1, wherein each of the plurality of drawing data generators includes an intermediate data acquiring part that acquires, on a page-by-page basis, the intermediate data stored in the first memory.

3. The image processing system according to claim 1, further comprising:
   a controller that performs control for activating a printer once an amount of drawing data stored in the second memory exceeds a second threshold that is set in advance and that is larger than the first threshold, the printer performing printing in accordance with drawing data.

4. An image processing method comprising:
- interpreting an assigned data portion of document data, written in a page description language, to generate intermediate data with a plurality of intermediate data generators;
- storing the generated intermediate data in a first memory;
- reading out the intermediate data from the first memory;
- generating drawing data, including information about each pixel included in a printed image, in accordance with the read out intermediate data, with a plurality of drawing data generators;
- storing the generated drawing data in a second memory; and
- receiving user input for selecting one of the first memory and the second memory,
- wherein once an amount of intermediate data stored in the first memory exceeds a first threshold that is set in advance, reading out of the intermediate data from the first memory starts,
- wherein when user input for selecting the first memory is received, the generated intermediate data is written by each of the plurality of intermediate data generators in the first memory and once the amount of intermediate data stored in the first memory exceeds the first threshold, the intermediate data is started to be read out from the first memory by the plurality of drawing data generators, and
- wherein when the user input for selecting the second memory is received, the generated intermediate data is supplied by each of the plurality of intermediate data generators, and the drawing data is generated by each of the plurality of drawing data generators in accordance with the intermediate data and the generated drawing data is written in the second memory.

5. A non-transitory computer readable medium storing a program causing a computer to execute a process for image processing, the process comprising:
- interpreting an assigned data portion of document data, written in a page description language, to generate intermediate data with a plurality of intermediate data generators;
- storing the generated intermediate data in a first memory;
- reading out the intermediate data from the first memory;
- generating drawing data, including information about each pixel included in a printed image, in accordance with the read out intermediate data, with a plurality of drawing data generators;
- storing the generated drawing data in a second memory; and
- receiving user input for selecting one of the first memory and the second memory,
- wherein once an amount of intermediate data stored in the first memory exceeds a first threshold that is set in advance, reading out of the intermediate data from the first memory starts,
- wherein when user input for selecting the first memory is received, the generated intermediate data is written by each of the plurality of intermediate data generators in the first memory and once the amount of intermediate data stored in the first memory exceeds the first threshold, the intermediate data is started to be read out from the first memory by the plurality of drawing data generators, and
- wherein when the user input for selecting the second memory is received, the generated intermediate data is supplied by each of the plurality of intermediate data generators, and the drawing data is generated by each of the plurality of drawing data generators in accordance with the intermediate data and the generated drawing data is written in the second memory.

* * * * *